(12) United States Patent
Lemke (10) Patent No.: US 10,151,382 B2
(45) Date of Patent: Dec. 11, 2018

(54) PLANETARY GEAR CARRIER ASSEMBLY AND RELATED METHOD OF MAKING

(71) Applicant: GKN SINTER METALS, LLC, Auburn Hills, MI (US)

(72) Inventor: Jeffrey W. Lemke, St. Thomas (CA)

(73) Assignee: GKN Sinter Metals, LLC, Auburn Hills, MI (US)

( * ) Notice: Subject to any disclaimer, the term of this patent is extended or adjusted under 35 U.S.C. 154(b) by 312 days.

(21) Appl. No.: 15/024,975

(22) PCT Filed: Sep. 17, 2014

(86) PCT No.: PCT/US2014/055989
§ 371 (c)(1),
(2) Date: Mar. 25, 2016

(87) PCT Pub. No.: WO2015/047808
PCT Pub. Date: Apr. 2, 2015

(65) Prior Publication Data
US 2016/0265653 A1    Sep. 15, 2016

Related U.S. Application Data

(60) Provisional application No. 61/883,325, filed on Sep. 27, 2013.

(51) Int. Cl.
| | |
|---|---|
| *F16H 57/08* | (2006.01) |
| *B22F 5/10* | (2006.01) |
| *F16H 57/00* | (2012.01) |
| *F16B 21/18* | (2006.01) |

(Continued)

(52) U.S. Cl.
CPC ............. *F16H 57/082* (2013.01); *B22F 5/10* (2013.01); *B22F 5/106* (2013.01); *B22F 5/08* (2013.01);

(Continued)

(58) Field of Classification Search
None
See application file for complete search history.

(56) References Cited

U.S. PATENT DOCUMENTS 2,047,706 A * 7/1936 Reed .................. F16B 21/18
384/425
8,062,168 B2 * 11/2011 Ziemer ............... F16H 63/3026
192/3.52

(Continued)

FOREIGN PATENT DOCUMENTS

| CN | 202971819 U | 6/2013 |
|---|---|---|
| DE | 197 16 030 A1 | 11/1998 |

(Continued)

OTHER PUBLICATIONS

The State Intellectual Property Office of the People's Republic of China, Notice on the First Office Action for corresponding Chinese Application No. 201480053250.X, dated May 2, 2017, 11 pages.

(Continued)

*Primary Examiner* — Robert W Hodge
*Assistant Examiner* — Ryan P Dodd
(74) *Attorney, Agent, or Firm* — Quarles & Brady LLP (57) ABSTRACT

An improved planetary gear carrier assembly is disclosed including a carrier and a ring. The carrier has a hub extending in an axial direction. The hub has splines on a radially-outward facing surface that extend in an axial direction and further has a first set of groove sections on the radially-outward facing surface in which the first set of groove sections extends circumferentially around the hub and through the splines. The ring is received around the hub of the carrier and has splines on a radially-inward facing surface. The splines in the ring are received in the first set of groove sections by axially nesting the splines of the carrier and ring into one another and then angularly rotating the ring relative to the carrier. With the splines of the ring twisted in the groove sections of the carrier, the ring can be axially restricted relative to the carrier.

12 Claims, 9 Drawing Sheets

(51) Int. Cl.
*B22F 5/08* (2006.01)
*B22F 5/00* (2006.01)

(52) U.S. Cl.
CPC ..... *B22F 2005/005* (2013.01); *B22F 2998/10* (2013.01); *F16B 21/18* (2013.01); *F16H 57/0025* (2013.01); *F16H 57/08* (2013.01); *F16H 2057/0056* (2013.01)

(56) References Cited

U.S. PATENT DOCUMENTS

| | | |
|---|---|---|
| 2007/0078037 A1 | 4/2007 | Chang |
| 2008/0188338 A1* | 8/2008 | Kimes .................. F16H 57/082 475/148 |
| 2011/0188890 A1 | 8/2011 | Hoshino et al. |

FOREIGN PATENT DOCUMENTS

| | | |
|---|---|---|
| DE | 10 2012 204354 B3 | 9/2013 |
| GB | 2 446 265 A | 8/2008 |
| JP | S616065 U | 1/1986 |
| JP | H0518422 A | 1/1993 |
| JP | H07301306 A | 11/1995 |
| WO | 2009/027540 A1 | 3/2009 |

OTHER PUBLICATIONS

International Search Report and Written Opinion dated Jan. 8, 2015 in connection with PCT/US2014/055989.
Japan Patent Office, Notification of Reason for Refusal, Application No. 2016-545758, dated Mar. 13, 2018, 6 pages.

* cited by examiner

PLANETARY GEAR CARRIER ASSEMBLY AND RELATED METHOD OF MAKING

CROSS-REFERENCE TO RELATED APPLICATIONS

This application represents the national stage entry of PCT International Application No. PCT/US2014/055989 filed Sep. 17, 2014, which claims priority to U.S. Provisional Patent Application No. 61/883,325 filed Sep. 27, 2013, which are hereby incorporated by reference for all purposes as if set forth in their entirety herein.

BACKGROUND

This application relates to planetary gear carrier assemblies in which at least one of the components is made from a powder metal material and related methods of making such assemblies. More specifically, this application relates to improvements in the way that a ring, such as a disc lock ring, is connected to the hub of the carrier.

Planetary gear carrier assemblies are commonly used in automatic transmissions to create various gear ratios while driving a car. Such assemblies often include various gears (for example, a sun gear, planet gears, and a ring gear) that can be selectively locked together to create the different gear ratios.

In such assemblies, a disc lock ring is often coupled to the hub of the carrier in order to capture other components between the ring and an axial face of the carrier. For example, a plate for positioning the planetary disc carrier assembly relative to the rest of the transmission assembly and bearings could be captured between the carrier and the ring. In still other assemblies, clutch packs might be captured in this space between the ring and carrier.

Figure 1A:
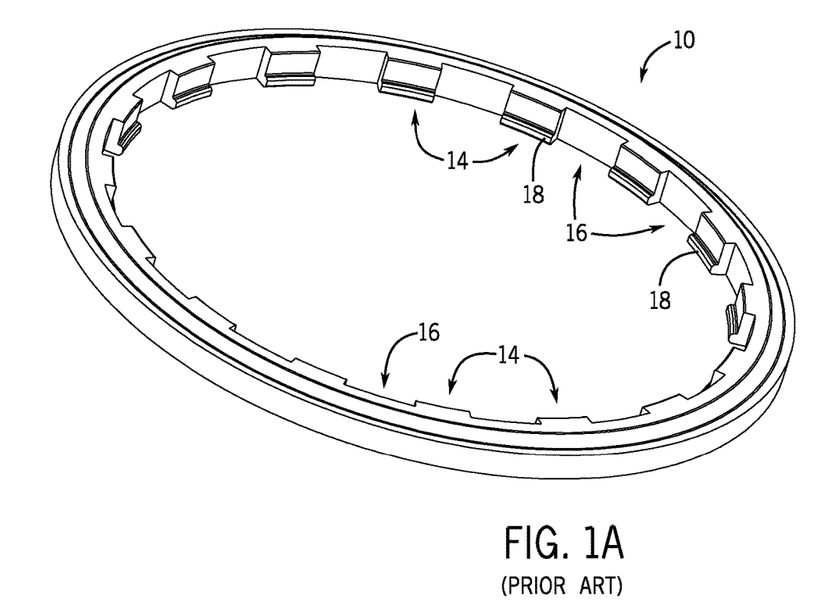
FIG. 1A is a perspective view of a prior art ring and FIG. 1B is a detailed cross-sectional view taken through the prior art ring of FIG. 1A.
Figure 1B:
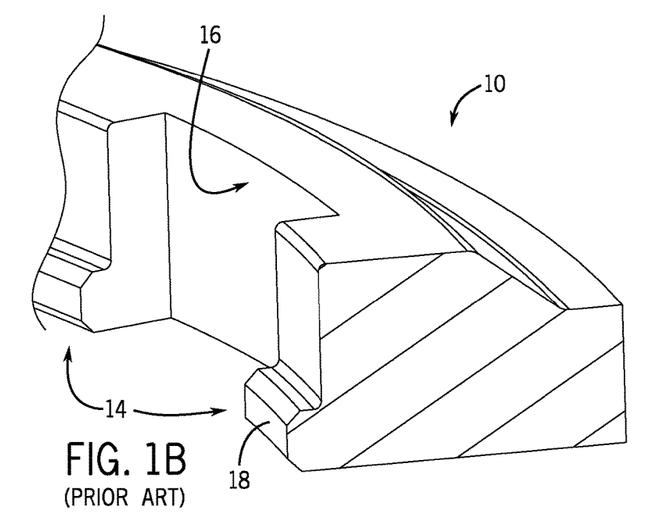
Figure 2A:
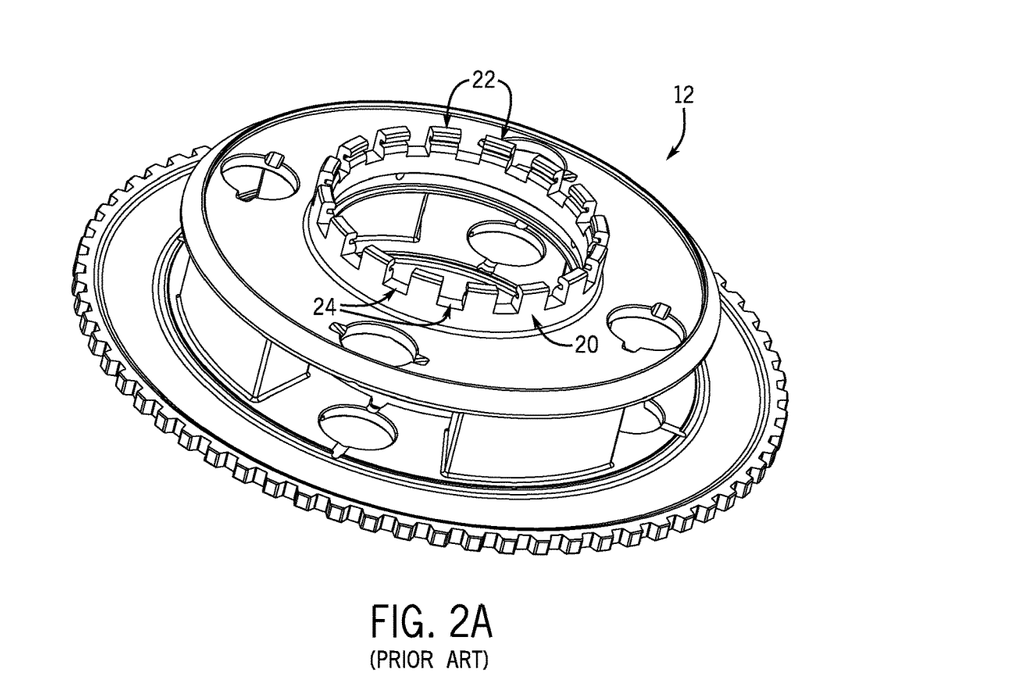
FIG. 2A is a perspective view of a prior art carrier and FIG. 2B is a detailed cross-sectional view taken through the prior art carrier.
Figure 2B:
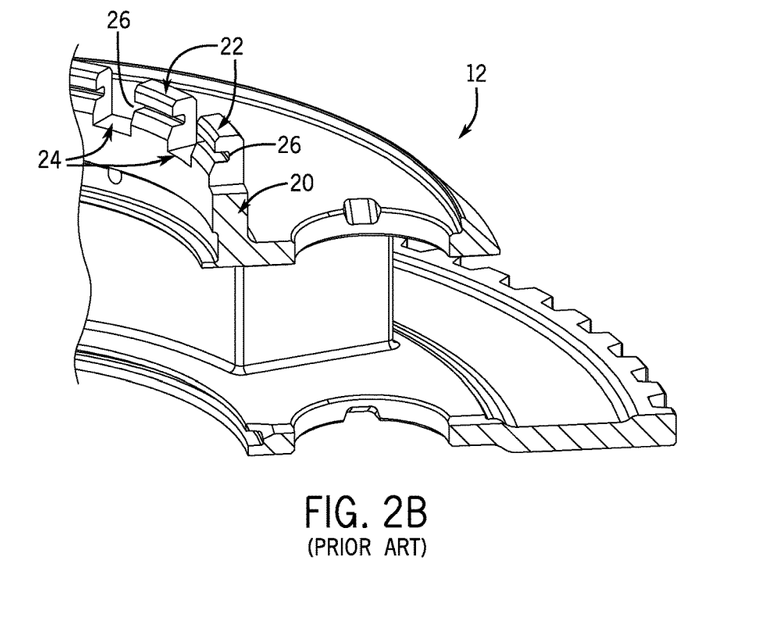

FIGS. 1A, 1B, 2A, and 2B illustrate a prior art ring 10 and carrier 12 made from powder metal that can be connected to achieve such purposes. In FIGS. 1A and 1B, the ring 10 is generally annular in shape and has a number of radially-inward facing projections 14 or teeth with recesses 16 therebetween. Each of the projections 14 has a ridge 18 at a lower axial end of the radially-inward facing surface of the projection 14. In FIGS. 2A and 2B, the prior art carrier 12 has an axially extending hub 20 with a castellated axial end in which various projections 22 extend axially upward from the axial end of the hub 20 such that there are recesses 24 there between. The projections 22 each have sections of a circumferential groove 26 formed on a radially-inward facing surface of the projections 22.

When the ring 10 is received over the hub 20 of the carrier 12, the radially-extending projections 14 and recesses 16 of the ring 10 interlock with the recesses 24 and the axially-extending projections 22 of the carrier 12, respectively. Once the projections and recesses are nested in one another, then a circumferential channel is established by the ridges 18 on the ring 10 and the various sections of the circumferential groove 26 on the carrier 12. To axially restrict or lock the ring 10 on the carrier 12, a snap ring (not illustrated) is inserted into this circumferential channel. With the snap ring in place, the sections of a circumferential groove 26 prevent the snap ring from axial movement and the ring 10 cannot be readily removed from the carrier 12 as the ridges 18 on the ring 10 cannot pass the snap ring.

Unfortunately, through experience, it has been discovered that this prior art planetary gear carrier assembly is not as structurally robust as is desired.

As an initial concern, the flanks of the projections 22 of the carrier 12 are subject to particularly high stresses and are prone to failure or damage. When the carrier 12 is fabricated from powder metal, in order to further strengthen these castellated sections the carrier 12 may be infiltrated with copper. Such copper infiltration occurs with the carrier 12 in a position upside-down from that illustrated in FIGS. 2A and 2B (that is, with the castellated section facing downward). However, in this position, the copper still often fails to infiltrate all the way down to the castellated projections, now positioned at the bottom of the carrier 12. When copper infiltration is inconsistent or incomplete, then the castellated area remains structurally weak and the sections of the circumferential groove 26 will still be particularly prone to failure.

Hence, a need exists for a planetary gear carrier assembly made from powder metal materials in which a disc lock ring is attachable to the hub of the carrier in a manner that is less prone to failure and that can withstand higher stresses.

SUMMARY OF THE INVENTION

An improved planetary gear carrier assembly is disclosed including a carrier and a ring. The carrier has a hub extending in an axial direction. The hub has a plurality of splines on a radially-outward facing surface of the hub that extend in an axial direction and the hub further has a first set of groove sections on the radially-outward facing surface in which the first set of groove sections extends circumferentially around the hub and through the plurality of splines. A ring, such as a disc lock ring, is received around the hub of the carrier. This ring also has a plurality of splines on a radially-inward facing surface of the ring. The plurality of splines of the ring are received in the first set of groove sections by axially nesting the plurality of splines of the carrier and the ring into one another and then the ring is angularly rotated relative to the carrier. With the splines of the ring twisted into the circumferential groove sections of the carrier, the ring can be axially restricted or locked relative to the carrier. At least one of the carrier and the disc lock ring are a powder metal component, meaning that they are formed from a compacted and sintered powder metal.

The assembly can further include a clip interposed between the ring and carrier that prevents further angular rotational movement of the ring relative to the carrier, such that the ring is angularly restricted and is thereby prevented from assuming another angular position in which the ring may be axially withdrawn from the carrier. As one example, the clip may be an annular disc having a plurality of axially extending prongs in which the prongs are received in at least some of the plurality of splines of the carrier between the carrier and the ring to inhibit angular rotational movement of the disc lock ring relative to the carrier. Further still, the carrier may further include a second set of groove sections on the radially-outward facing surface of the hub of the carrier in which the second set of groove sections extend circumferentially around the hub and through the plurality of splines at a different axial position that the first set of groove sections and the prongs of the clip may be deformable and may have ears that are received in these second set of groove sections in order to axially maintain the clip in place relative to the carrier. In other forms, there may be a plurality of clips that are shaped to be snapped into place between the disc lock ring and the carrier in the splines of the carrier and to maintain an axial position of the carrier relative to the disc lock ring.

The geometry of the splines may be used to help facilitate assembly or to restrict or lock the components together. For example, a recessed part of the splines of the carrier may have a first angular extent and a projecting part of the splines of the ring may have a second angular extent in which the first angular extent is larger than the second angular extent. The recessed part of the splines of the carrier also could include a third angular extent in which the first angular extent and the third angular extent are on different axial sides of the first set of groove sections. In this case, the first angular extent may be larger than the third angular extent and the second angular extent may be sized between the first angular extent and the third angular extent. This may permit the ring to be inserted over the hub, but effectively "bottom out" (preventing further axial insertion over the hub) when the ring enters the axial position of the first set of groove sections.

These ring and carrier of the planetary gear carrier assembly disclosed herein are advantageously designed to be formed using powder metal processes. However, it is also contemplated that one or more parts could be made using other fabrication techniques (for example, casting) without departing from the spirit of the invention. As noted above, it is contemplated that the carrier may be infiltrated with copper (although the carrier may also not be infiltrated with copper in some instances).

A related method of making a planetary gear carrier assembly is also disclosed. This method involves placing a ring over the hub of the carrier to nest their respective splines in one another. Then, the ring is rotated relative to the hub of the carrier such that the splines of the ring (and, in particular, the projecting portion of the splines) enter a set of groove sections that extend circumferentially around the hub of the carrier to axially restrict the ring relative to the carrier. At this point, an anti-rotation clip may be inserted between the carrier and the ring to prevent further angular rotation of the ring relative to the carrier, thereby preventing axial separation of the ring and carrier.

This planetary gear carrier assembly offers a number of advantages over the prior art design illustrated in FIGS. 1A, 1B, 2A, and 2B. Among other things, the peak stress on the newly disclosed assembly is approximately half of that in the prior art design for similarly sized parts. Moreover, the splined engagement of the ring and the carrier better distribute the stresses than the old snap ring style of attachment. Because the peak stress is greatly reduced in the new assembly, the materials do not need to be as strong. Accordingly, where copper infiltration might have been necessary for some applications in the past in which the components were made of powder metal in order to achieve greater strength to avoid failure (or provide a sufficient safety margin in strength to avoid failure), infiltration may now be avoided altogether. This means that the problems associated with achieving full and consistent infiltration of the castellated sections in former designs are rendered moot.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 3:
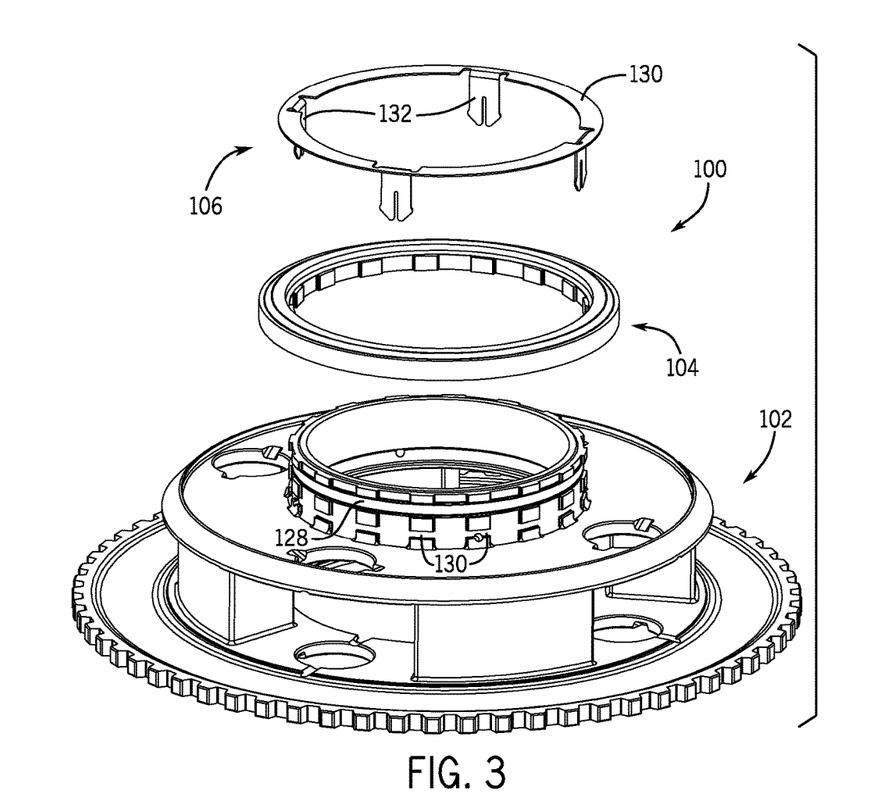
FIG. 3 is an exploded view of a planetary gear carrier assembly according to one aspect of the present invention in which the planetary gear carrier assembly includes a carrier, a ring, and a clip.
Figure 4:
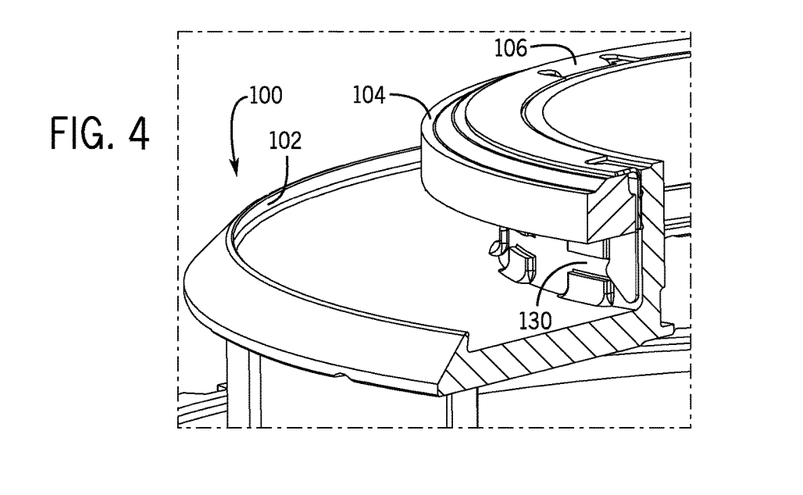
FIG. 4 is a cross-sectional view taken through the planetary gear carrier assembly made from the exploded parts of FIG. 3 after they have been assembled.

Referring now to FIGS. 3 and 4, a planetary gear assembly 100 is illustrated including a carrier 102, a disc lock ring 104, and an anti-rotation clip 106. One or both of the carrier 102 and the disc lock ring 104 may be fabricated from powder metal materials using conventional powder metallurgy techniques such as powder compaction, sintering, and so forth. Because one of ordinary skill in the art will appreciate that manner of making these parts and the variations that may be made in their production (such as, for example, forging, carburizing, and so forth) their production will not be described in great detail.

Figure 5:
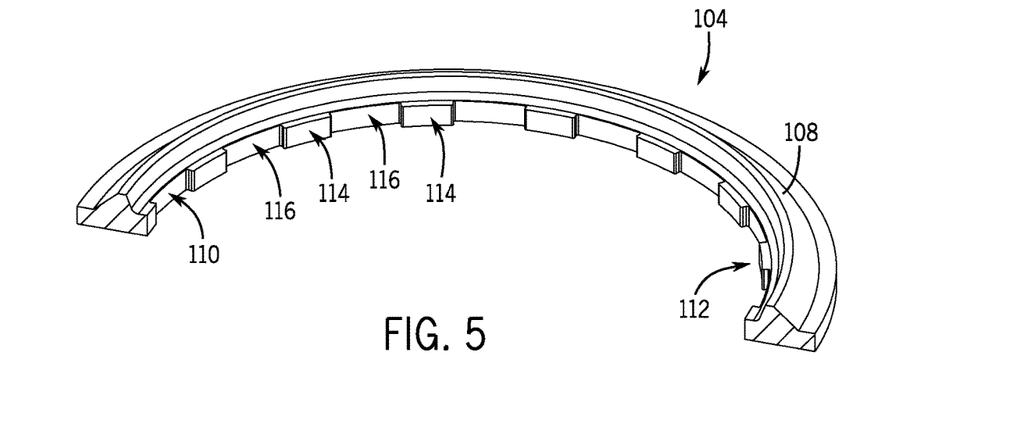
FIG. 5 is a perspective cross-sectional view of half of the ring from the planetary gear carrier assembly of FIGS. 3 and 4.

Now with specific reference to FIG. 5, the ring 104 is shown apart from the assembly 100. In FIG. 5, only half of the ring 104 is shown to better illustrate the cross section of the ring 104. However, in the assembly 100, the ring 104 is actually a full annular ring extending a full 360 degrees. The ring 104 includes an annular body section 108 having a radially-inward facing surface 110. On this radially-inward facing surface 110, there are a plurality of splines 112 that extend in an axial direction. For the sake of clarity in description, these splines 112 have alternating projecting parts 114 and recessed parts 116. The projecting parts 114 of the splines 112 all have an angular extent (that is, an angular length between the two adjacent recessed parts) and occur in a regular, repeating pattern with the recessed parts 116.

Figure 6:
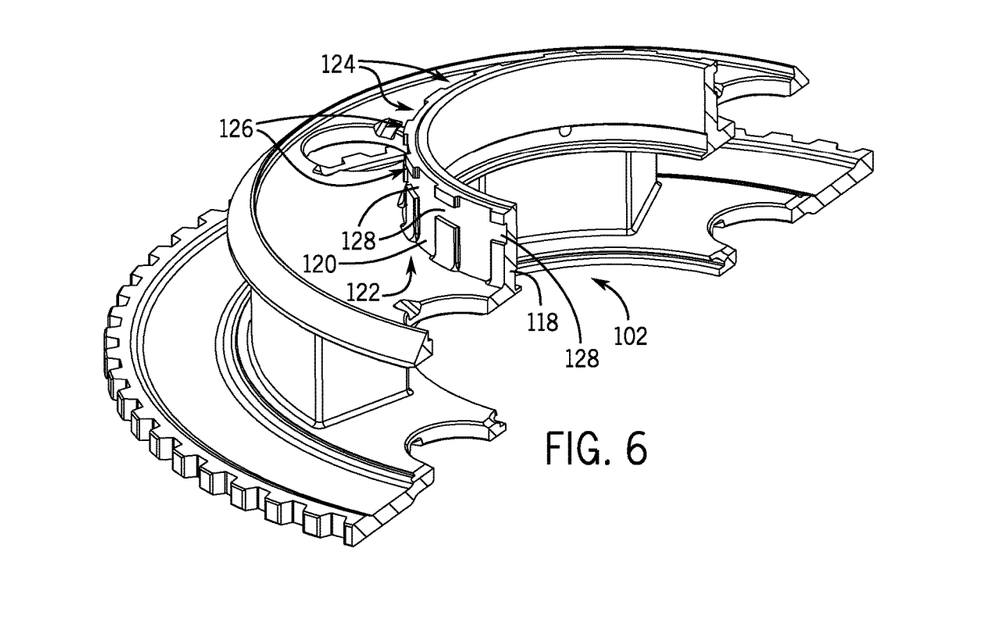
FIG. 6 is a perspective cross-sectional view of half of the carrier from the planetary gear carrier assembly of FIGS. 3 and 4 (it is noted that, as a variation, a second set of groove sections is not illustrated in this detailed view that are present in FIGS. 3 and 4).

Turning now to FIG. 6, a carrier 102 is illustrated apart from the assembly 100 without the ring 104 and the anti-rotation clip 106. The carrier 102 includes a hub 118 extending in an axial direction of the carrier 102. On a radially-outward facing surface 120 of the hub 118, a plurality of splines 122 are formed that extend along the axial direction. Again, for the sake of clarity of description these splines 122 have recessed parts 124 and projecting parts 126.

Additionally, there is a first set of groove sections 128 formed in the radially-outward facing surface 120 of the hub 118. This first set of groove sections 128 extend circumferentially around the hub 118 and through the projection parts 126 of the plurality of splines 122. Effectively, these groove sections 128 are cut recesses in the projecting parts 126 of the splines 122 and the recessed surface may be continuous between the recessed parts 124 of the splines 122 and groove sections 128. Because the carrier 102 is made using powder metal processes in which tooling arrangements do not always readily permit the formation of an annular undercut of this type (although some do or may), this first set of groove sections 128 may also be machined into the hub 118, for example by using a lathe. However, it is contemplated that the undercut of the groove sections 128 may be formed in other ways.

With specific reference back to FIGS. 3 and 4, there may also be a second set of groove sections 130 formed at a different axial height than the first set of groove sections 128 according to one variation. In the form illustrated, the first set of groove sections 128 is formed closer to the axial end of the hub 118, while the second set of groove sections 130 is formed closer to the location at which the hub 118 attaches to the remainder of the carrier 102. This second set of groove sections 130 is only found in some embodiments and, as will be described in greater detail below, can be used to receive portions of certain types of clips 106 to assist in retaining the clips 106 in place. However, other types of clips may not utilize these groove sections 130 and, in such instances, there would be no reason for inclusion of the second set of groove sections 130. As with the first set of groove sections 128, the second set of groove sections 130 may be machined into the powder metal component, might be formed in the component during compaction, or could be formed in the powder metal component in other ways.

Figure 7A:
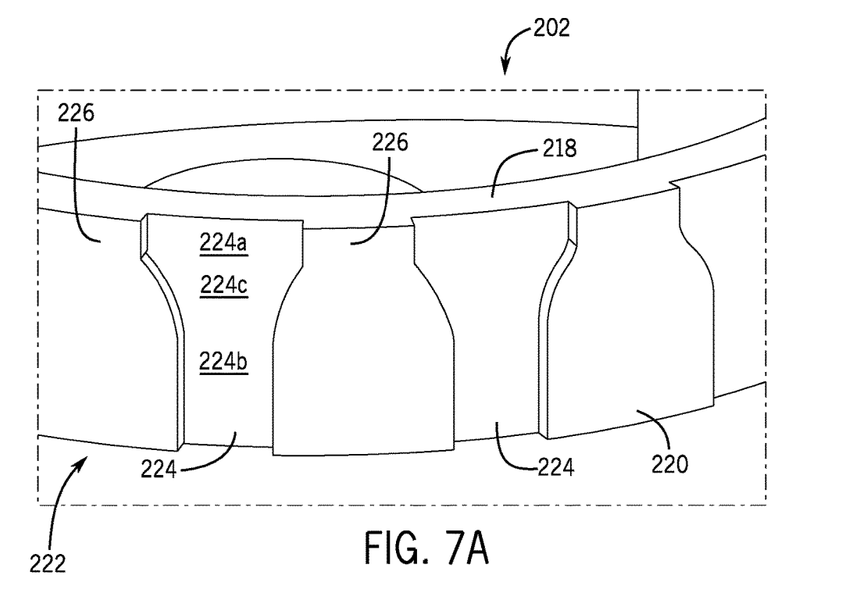
FIG. 7A is a perspective view of another carrier in accordance with another aspect of the present invention in which the carrier has differently formed splines on a hub before a circumferential groove is machined into the hub and FIG. 7B is a perspective view of the carrier of FIG. 7A after the circumferential groove is machined into the hub.
Figure 7B:
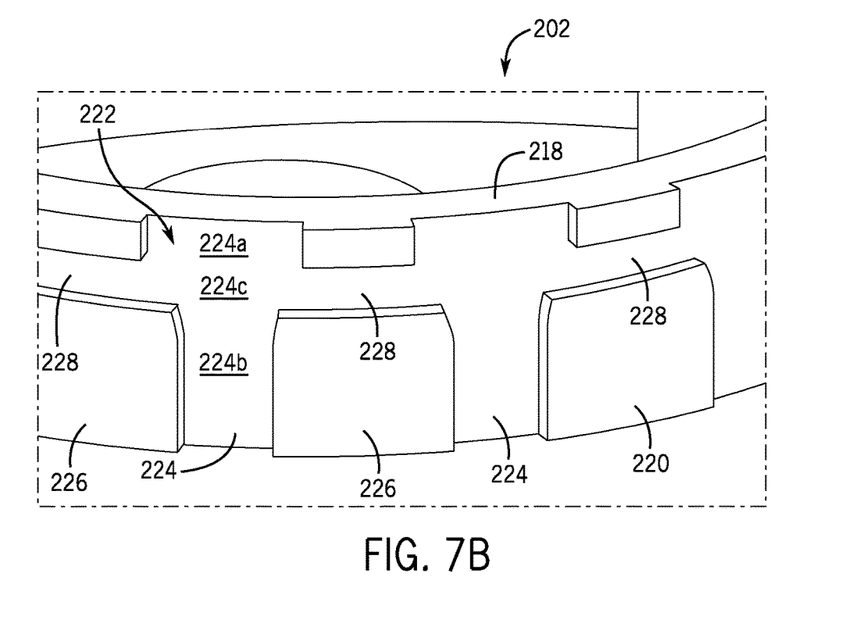
Figure 8:
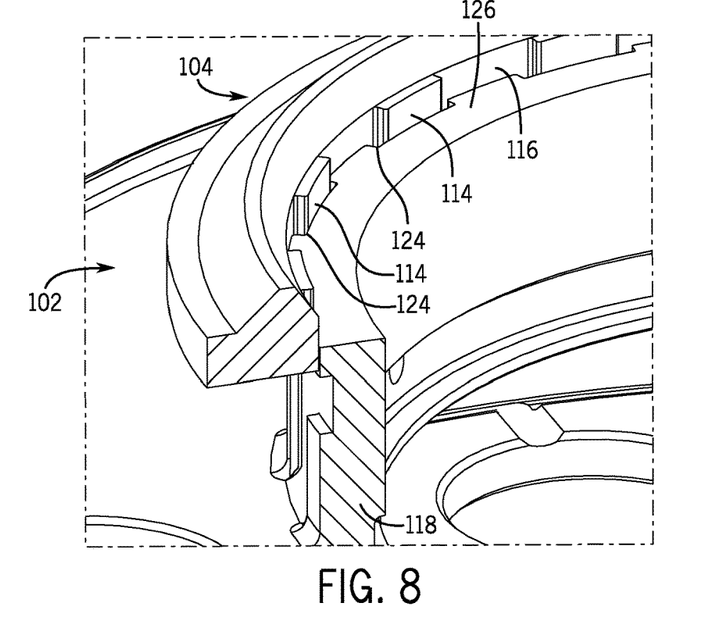
FIG. 8 illustrates a first assembly step in which the ring is inserted onto the hub of the carrier with their respective splines entering one another.
Figure 9:
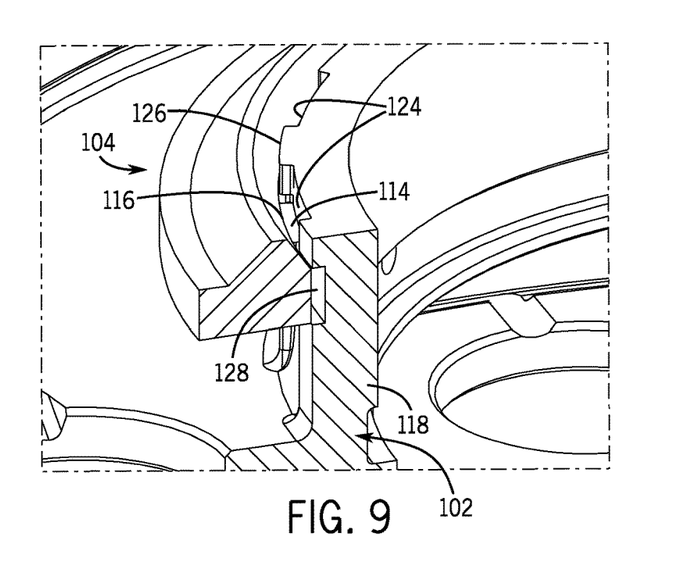
FIG. 9 illustrates a second assembly step in which the ring has been received on the hub of the carrier to the point at which the splines of the ring are aligned with the circumferential groove sections in the hub.
Figure 10:
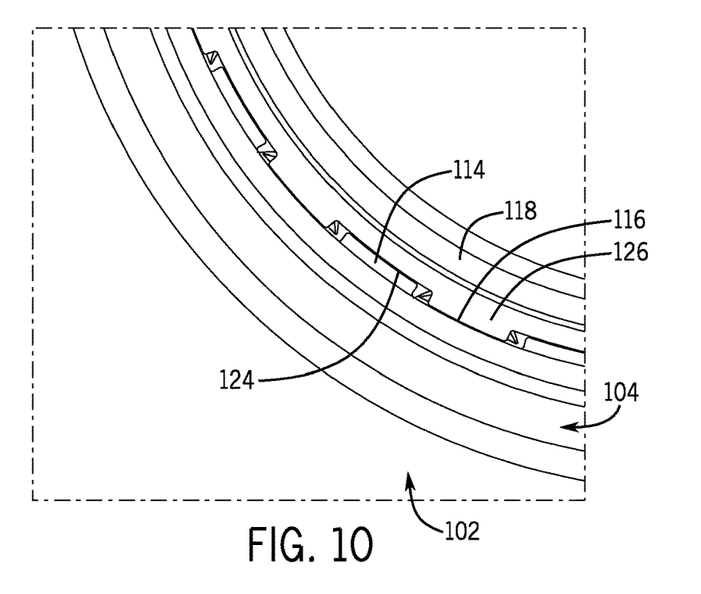
FIG. 10 is a top view of the ring and the carrier when the splines of the ring and the splines of the carrier are nested in one another (that is, when the ring is at the angular position illustrated in FIGS. 8 and 9).
Figure 11:
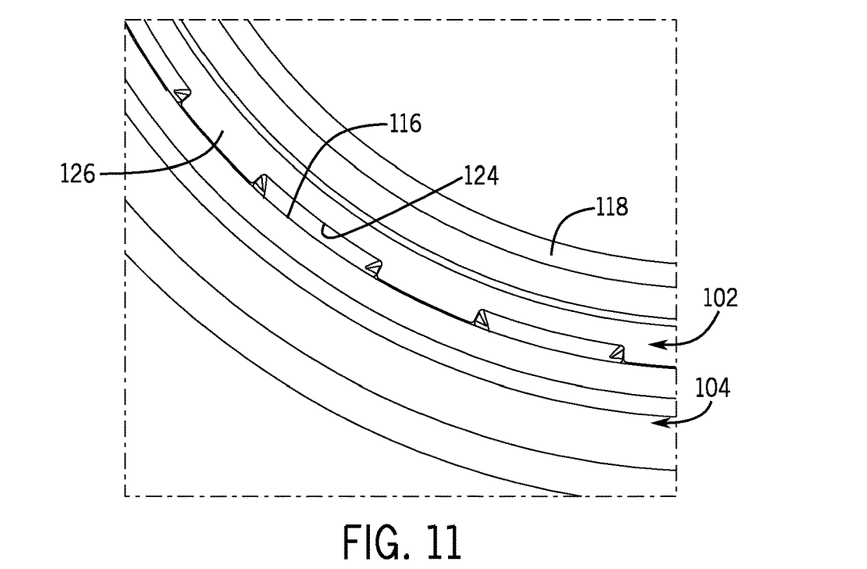
FIG. 11 is a top view of the ring and the carrier after the ring has been angularly rotated relative to the carrier to place the projecting part of the splines in the ring into the circumferential groove sections of the hub of the carrier.

Looking now at FIGS. 7A and 7B, an alternative spline and groove arrangement are illustrated according to another embodiment. In this arrangement and as illustrated in FIG. 7A, the carrier 202 initially has a radially-outward facing surface 220 on a hub 218 on which axially-extending splines 222 are formed including recessed parts 224 and projecting parts 226. However, in this illustrated embodiment, the recessed parts 224 have a wider section 224a near the top axial end of the hub 218 and a narrower section 224b at the end closer to the bottom axial end at which the hub 218 is joined to the carrier 202. There is a tapered section 224c positioned between the two other sections. This recess geometry (in which the recess expands toward an axial end of the component) can be readily formed using powder metal processes, because the outward tapering permits the axial withdrawal of the compaction tooling.

As illustrated in FIG. 7B, a first set of groove sections 228 can be machined (or otherwise formed) into the tapered section 224c from FIG. 7A, such that the groove sections 228 circumferentially extend around the hub 218. In contrast to the embodiment illustrated in FIGS. 3 and 4, this means that the wider section 224a of the recessed part 224 has a greater angular extent that the narrower section 224b of the recessed part 224 of the splines 222. It is contemplated that the angular extent of the projecting part 114 of the ring 104 may be sized to be between these two angular extents, such that the projecting part 114 can enter the recessed part 224 as far as the grooved sections 228, but no further (that is, the projecting part on the ring can enter wider section 224a and the region of section 224c, but not enter narrower section 224b such that the ring is axially fixed relative to the grooved section, once the ring "bottoms out" on the narrower section 224b).

Referring now to FIGS. 8 through 13, the process for assembling the ring 104 to the carrier 102 is illustrated in greater detail. First, the ring 104 and the carrier 102 are axially aligned and the ring 104 is placed around or inserted over the hub 118 of the carrier 102 as illustrated initially in FIG. 8 and, after further insertion, in FIG. 9. During this step, the projecting parts 114 of the ring 104 are received or nested in the recessed parts 124 of the carrier 102 and the projecting parts 126 of the carrier 102 are received or nested in the recessed parts 116 of the ring 104. Although this can be seen in FIGS. 8 and 9, the alignment is most clearly illustrated in the top view of FIG. 10. This axial insertion action is made until the projecting parts 114 of the splines 112 of the ring 104 are axially aligned with the groove sections 128 on the carrier 102. If the splines of the carrier have a shape like that formed in FIG. 7B, then the projecting parts of the ring may "bottom out" during insertion such that they cannot be further axially inserted over the hub once the contact the narrower section of the recessed part of the carrier as noted above.

Figure 12:
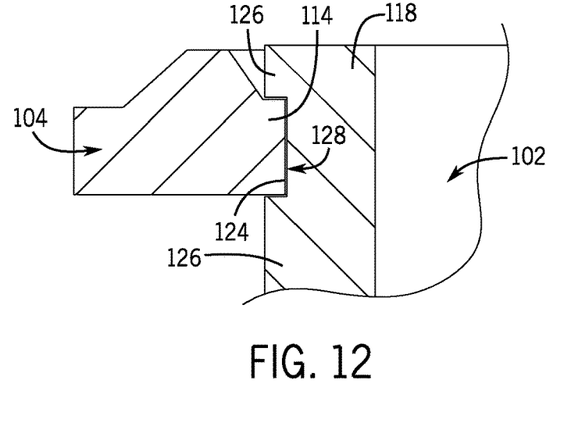
FIG. 12 is a cross-sectional side view taken through the ring and the hub of the carrier after rotation of the ring, as in FIG. 11, to illustrate the engagement of the splines of the ring with the circumferential groove sections of the carrier and to illustrate how at this angular position, the ring is inhibited from axially moving relative to the carrier.
Figure 13:
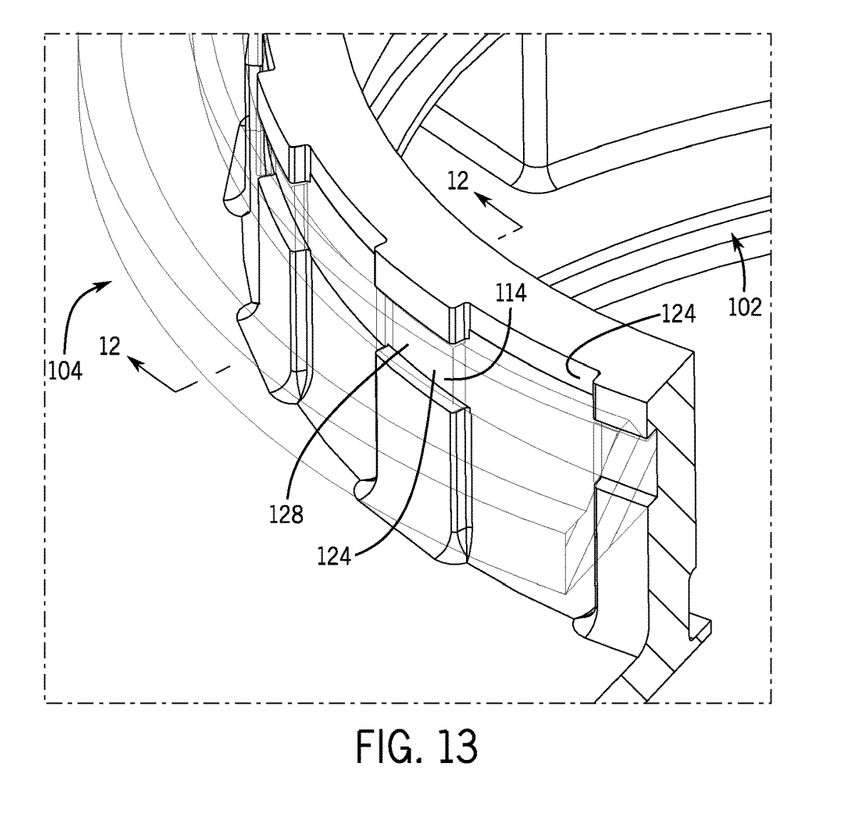
FIG. 13 is a perspective view of the planetary gear carrier assembly with the ring and the carrier in a position similar to that illustrated in FIGS. 11 and 12 (that is, in which the ring has been rotated into the circumferential groove sections), in which the ring is semi-transparent.

In any event, once the projecting parts 114 of the splines 112 of the ring 104 are axially aligned with the groove sections 128 on the carrier 102 (that is, once they are at the same axial position or height), then the ring 104 is twisted relative to the carrier 102 to angularly rotate the projecting parts 114 of the ring 104 into the groove sections 128 of the carrier 102. After twisting or rotation, the position of the ring 104 on the carrier 102 is best illustrated in the top view of FIG. 11, the side view of FIG. 12, and the perspective view of FIG. 13. At this angular position, the projecting parts 114 of the ring 102 are axially captured in the groove sections 128 of the hub 118 between upper and lower segments of the projecting parts 126 of the splines 122 of the carrier 102. As best illustrated in FIG. 12, this means that the ring 104 cannot move axially due to the interference of the projecting parts 126 of the splines 122 of the carrier 102 with the projecting parts 114 of the splines 112 of the ring 104.

However, if the ring 104 was able to angularly rotate relative to the carrier 102, then it is possible that the ring 104 could be axially removed with respect to the carrier 102 after subsequent relative angular rotation. In order to angularly maintain the ring 104 in place, the anti-rotation clip 106 is (or multiple clips are) interposed between the ring 104 and the carrier 102 to prevent or inhibit rotational movement of the ring 104 relative to the carrier 102.

Figure 14:
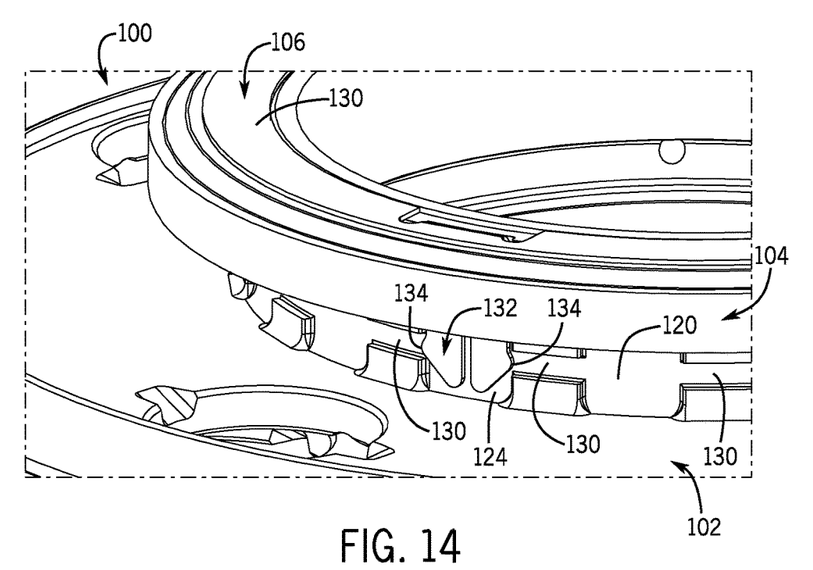
FIG. 14 is perspective view of the planetary gear carrier assembly in which the anti-rotation clip is inserted between the ring and the carrier to inhibit the angular rotation of the ring relative to the carrier.

As best illustrated in FIGS. 3, 4, and 14, a clip 106 may be axially inserted into this space between the ring 104 and the carrier 102 to lock the ring 104 and the carrier 102 together. In the form illustrated in these figures, the clip 106 is an annular disc 130 having a plurality of axially extending prongs 132. The prongs 132 are received in the recessed parts 124 of the splines 122 of the carrier 102 and the recessed parts 116 of the splines 112 of the ring 104 between the carrier 102 and the ring 102 to inhibit angular rotational movement of the ring 104 relative to the carrier 102.

In one form, best illustrated in FIG. 14, the prongs 132 may be deformable and have ears 134. Upon initial insertion into the space between the carrier 102 and the ring 104, the prongs 132 and their ears 134 may flex inwards. Then, upon alignment with the second set of groove sections 130 on the radially-outward facing surface 120 of the hub 118 of the carrier 102, the prongs 132 spring back to their original position and the ears 134 are received in the second set of groove sections 130 to axially maintain the clip 106 in place and prevent its unintended withdrawal.

It is contemplated that a clip of this type might be formed (for example, be stamped) from a sheet of mild steel. However, other materials might also be used to form the clip 106 and it is contemplated that they could be metal or plastic.

Figure 15:
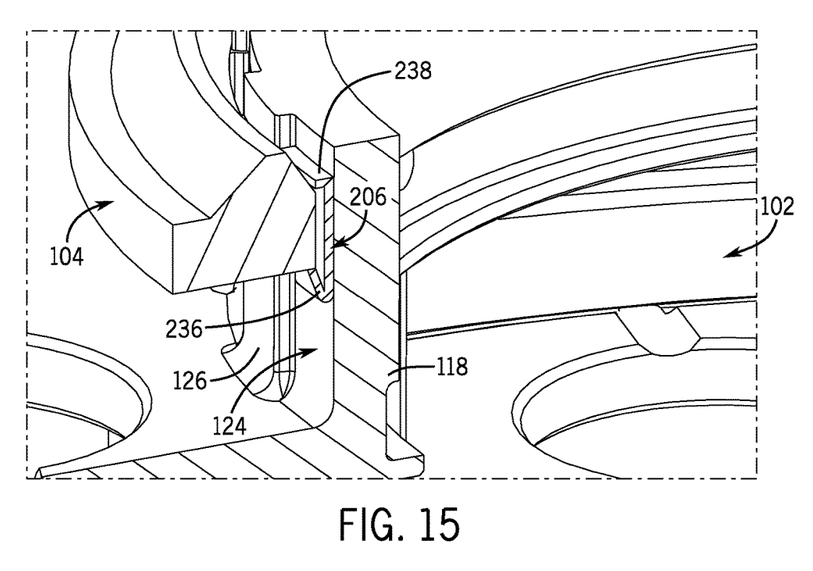
FIG. 15 is a perspective view of a planetary gear carrier assembly according to another aspect of the invention in which an alternative clip is inserted between the ring and the carrier to inhibit rotation of the ring relative to the carrier.

In still another embodiment and as illustrated in FIG. 15, multiple clips 206 might be used to inhibit or prevent the angular rotation of the ring 104 relative to the carrier 102. As illustrated in FIG. 16, a clip 206 with a lower J-hook section 236 and a top stop section 238 may be wedged into the space between the ring 104 and the carrier 102, and more specifically the recessed parts 124 of the splines 122 on the carrier 102 and the recessed parts 116 of the splines 112 the ring 104. During the step of inserting the clip 206, the J-hook section 236 may bend during entry and then snap back into form in such a way that the clip 206 is captured in place such that the top stop section 238 loosely abuts the top of the ring 104 and the J-hook section 236 loosely abuts the bottom of the ring 104. If the ring 104 were to try to rotate relative to the carrier 102, then the projecting part 114 of the ring 104 would snag on one side of the clip 206, and the opposing side of the clip 206 would be driven into the projecting part 126 of the carrier 102. This would prevent the ring 104 from rotating back to a position in which it could be axially separated from the carrier 102.

Although projecting parts of a ring are shown as entering circumferential grove sections of the carrier to axially restrain the components relative to one another, it is contemplated that the formations might be reversed. For example, a circumferential groove could be formed on the radially inward facing surface of the ring and this groove could engage radially outward facing splined projections on the hub of the carrier.

Further, although a planetary gear carrier assembly is shown, it is contemplated that this structure might be implemented in other assemblies to provide axial locking capabilities.

Thus, an improved structure is disclosed for assembly of one or more powder metal parts. By virtue of using an insertion and twist assembly, stresses applied are more evenly distributed over the splined interface than they were in the old snap ring style connection discussed above. Further, because the peak stresses are lower than for comparable assemblies, the need to infiltrate the powder metal parts with copper to improve their strength may be avoided, as copper infiltration was problematic with the castellated geometry. However, it is still contemplated the powder metal part or parts could be infiltrated using copper or other materials to further improve strength, although the need to do may be significantly reduced.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A planetary gear carrier assembly comprising:
   a carrier having a hub extending in an axial direction, the hub having a plurality of splines on a radially-outward facing surface of the hub that extend in an axial direction and the hub further having a first set of groove sections on the radially-outward facing surface in which the first set of groove sections extends circumferentially around the hub and through the plurality of splines;
   a disc lock ring received around the hub of the carrier, the disc lock ring having a plurality of splines on a radially-inward facing surface of the disc lock ring, wherein the plurality of splines in the disc lock ring are received in the first set of groove sections by axially nesting the plurality of splines of the carrier and the disc lock ring into one another and then angularly rotating the disc lock ring relative to the carrier to axially restrict the disc lock ring relative to the carrier;
   wherein at least one of the carrier and the disc lock ring are a powder metal component.

2. The planetary gear carrier assembly of claim 1, further comprising a clip interposed between the carrier and the disc lock ring that inhibits the angular rotation of the disc lock ring relative to the carrier.

3. The planetary gear carrier assembly of claim 2, wherein the clip is an annular disc having a plurality of axially extending prongs and wherein the prongs are received in at least some of the plurality of splines of the carrier between the carrier and the disc lock ring to inhibit angular rotational movement of the disc lock ring relative to the carrier.

4. The planetary gear carrier assembly of claim 3, wherein the carrier further comprises a second set of groove sections on the radially-outward facing surface of the hub of the carrier in which the second set of groove sections extend circumferentially around the hub and through the plurality of splines at a different axial position that the first set of groove sections and wherein the prongs of the clip are deformable and have ears that are received in the second set of groove sections in order to axially maintain the clip in place relative to the carrier.

5. The planetary gear carrier assembly of claim 3, wherein the clip includes a plurality of clips that are shaped to be snapped into place between the disc lock ring and the carrier in the splines of the carrier and to maintain an axial position of the carrier relative to the disc lock ring.

6. The planetary gear carrier assembly of claim 1, wherein a recessed part of the splines of the carrier has a first angular extent and a projecting part of the splines of the disc lock ring has a second angular extent and wherein the second angular extent is sized to be smaller than the first angular extent.

7. The planetary gear carrier assembly of claim 6, wherein the recessed part of the splines of the carrier also includes a third angular extent and the first angular extent and the third angular extent are on different axial sides of the first set of groove sections and wherein the first angular extent is larger than the third angular extent and the second angular extent is larger than the third angular extent.

8. The planetary gear carrier assembly of claim 1, wherein both of the disc lock ring and the carrier are powder metal components.

9. The planetary gear carrier assembly of claim 1, wherein the carrier is infiltrated with copper.

10. The planetary gear carrier assembly of claim 1, wherein the carrier is not infiltrated with copper.

11. A method of assembling a planetary gear carrier assembly, the method comprising:

placing a disc lock ring around a hub of a carrier, wherein the hub has a plurality of splines on a radially-outward facing surface of the hub that extend in an axial direction and the disc lock ring has a plurality of splines on a radially-inward facing surface of the disc lock ring that extend in the axial direction and wherein placing the disc lock ring around the hub includes nesting the splines of the carrier and the disc lock ring into one another; and angularly rotating the disc lock ring relative to the carrier to move the splines of the disc lock ring into a first set of groove sections on the radially-outward facing surface of the hub in which the first set of groove sections extend circumferentially around the hub and through the plurality of splines, thereby axially restricting the disc lock ring relative to the carrier.

12. The method of claim 11, further comprising the step of inserting at least one clip between the carrier and the disc lock ring to inhibit an angular rotation of the disc lock ring relative to the carrier, thereby preventing the plurality of splines of the disc lock ring and carrier from angularly rotating to a position at which the disc lock ring and carrier are separable from one another by relative axial movement.

* * * * *